A. L. ADAMS.
FOLDING CAMERA.
APPLICATION FILED SEPT. 16, 1910.

1,036,406.

Patented Aug. 20, 1912.
5 SHEETS—SHEET 1.

A. L. ADAMS.
FOLDING CAMERA.
APPLICATION FILED SEPT. 16, 1910.

1,036,406.

Patented Aug. 20, 1912.
5 SHEETS—SHEET 5.

Witnesses.
W. May Duvall.
Edwin J. Beller.

Inventor
Arthur L. Adams,
by Wilkinson, Fisher and
Witherspoon
Attorneys

UNITED STATES PATENT OFFICE.

ARTHUR LEWIS ADAMS, OF LONDON, ENGLAND.

FOLDING CAMERA.

1,036,406.   Specification of Letters Patent.   Patented Aug. 20, 1912.

Application filed September 16, 1910. Serial No. 582,384.

*To all whom it may concern:*

Be it known that I, ARTHUR LEWIS ADAMS, manufacturer of photographic apparatus, a subject of the King of Great Britain, residing at 24 Charing Cross road, in the city of London, England, have invented certain new and useful Improvements in Folding Cameras, of which the following is a specification.

The present invention relates to folding reflex cameras, and has for its purpose to provide a camera of that type embodying a mechanism wherein the focusing screen is swung into position and the camera as a whole unfolded through the movement of raising the hood supporting devices; and wherein the mirror is swung to and from operative position by a novel arrangement of rods and levers.

With these and other objects in view the invention consists in the novel details of construction and combinations of parts more fully hereinafter disclosed and particularly pointed out in the claims.

Figure 1:
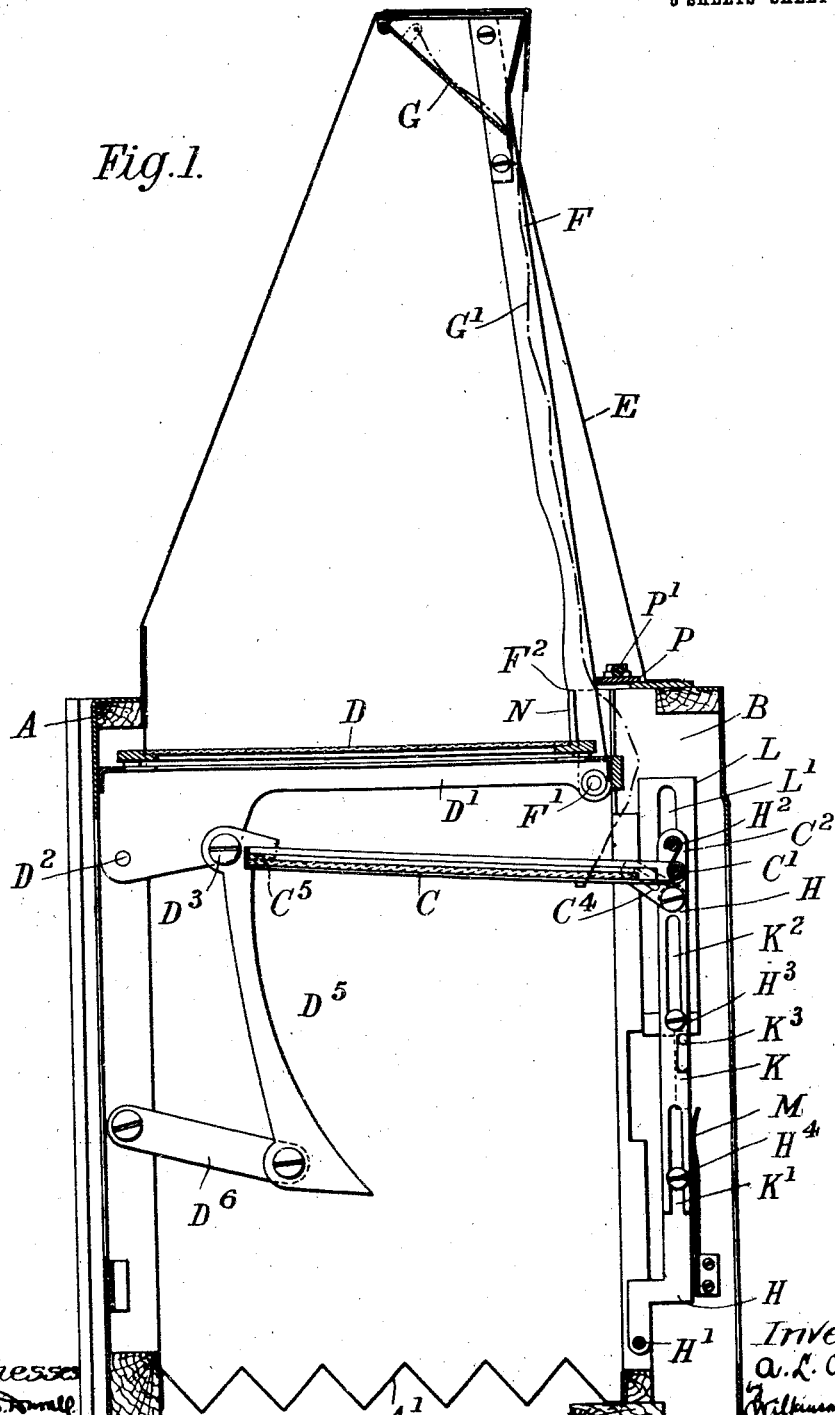
Figure 2:
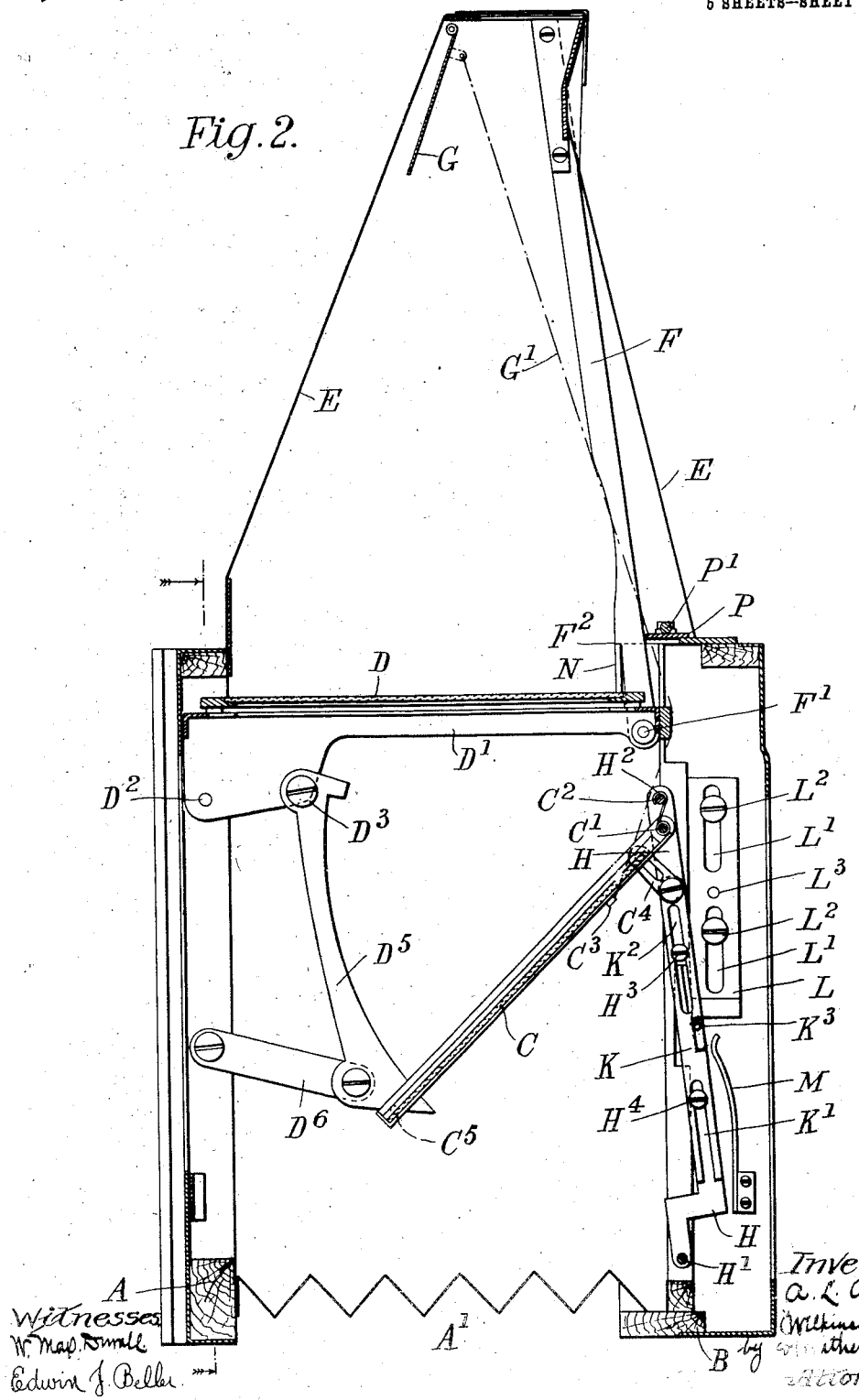
Figure 3:
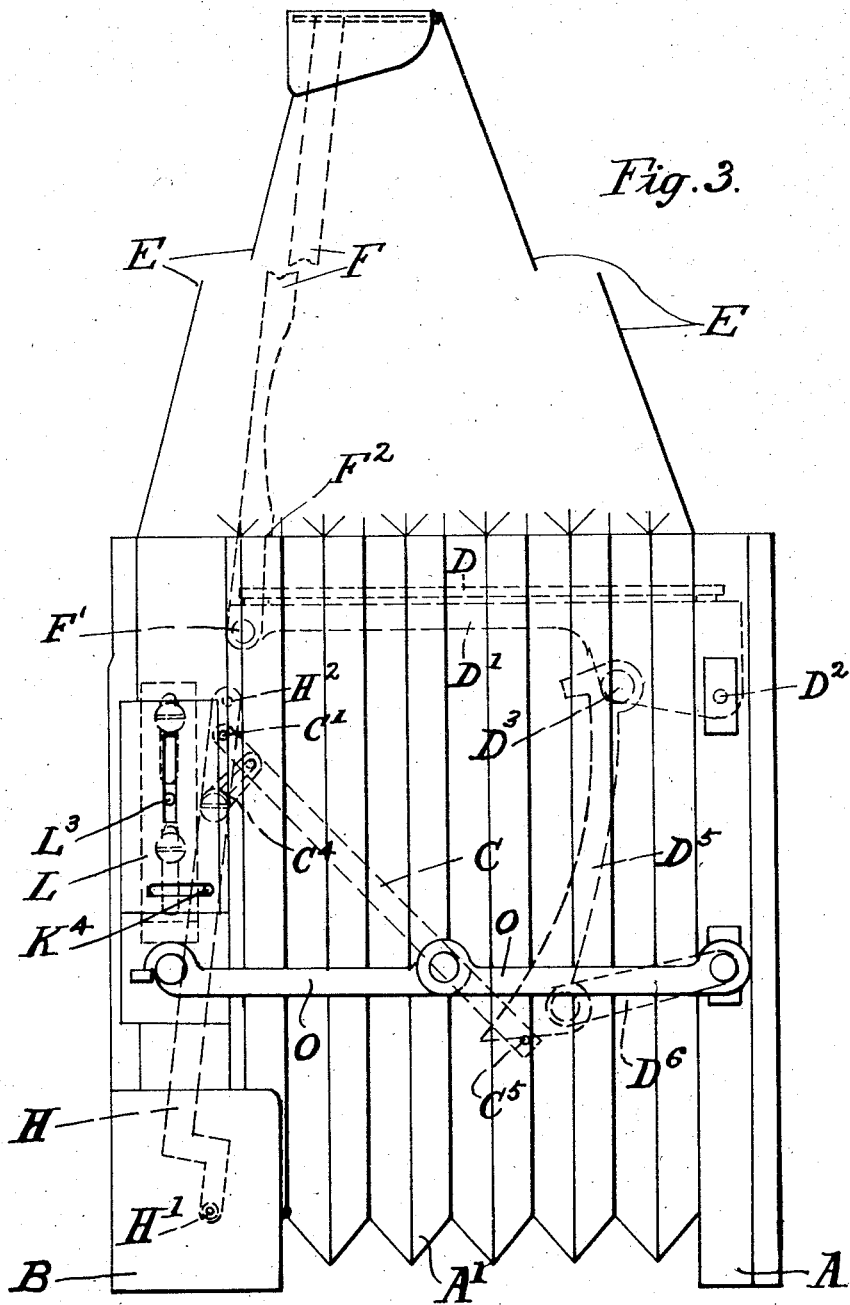
Figure 4:
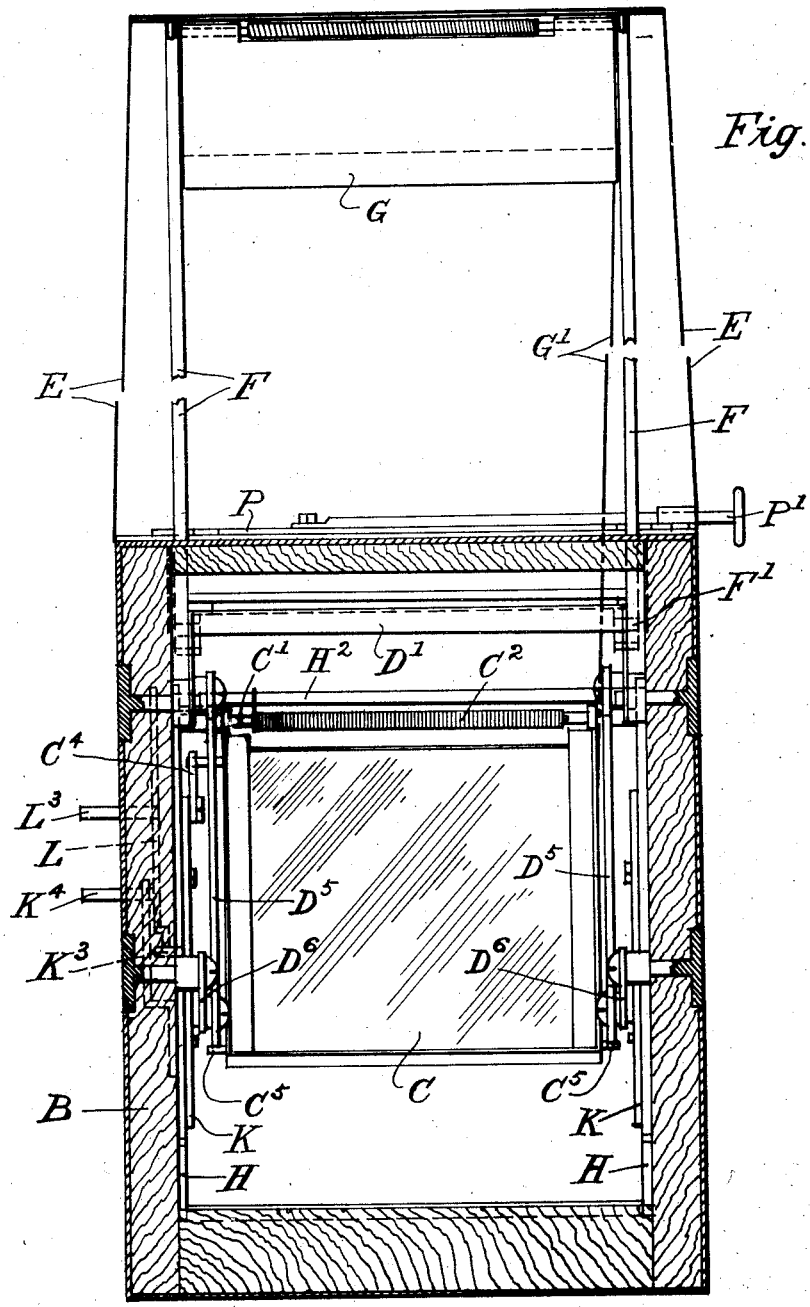
Figure 5:
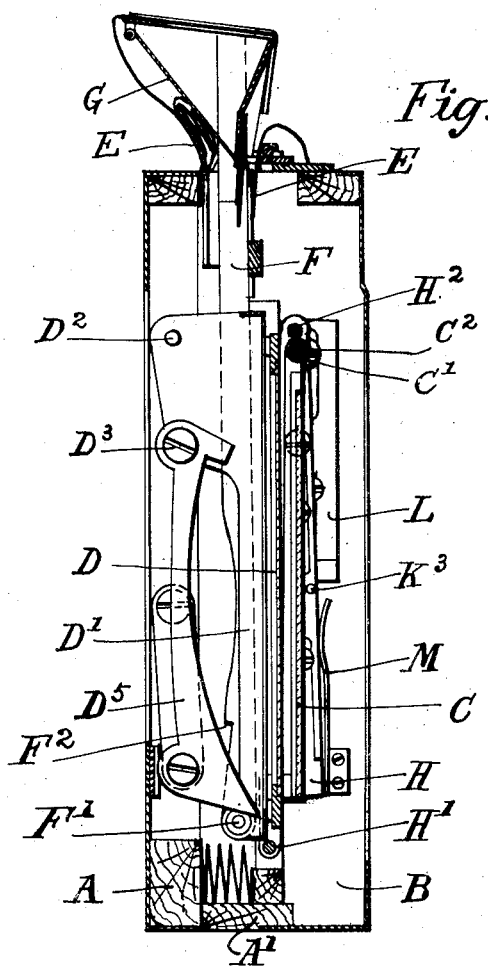
Figure 6:
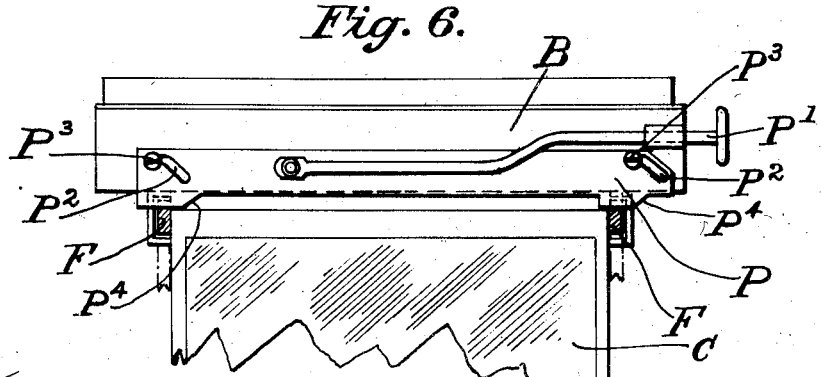

In the figures of these drawings:—Figure 1 represents a vertical lateral section when the shutter has been released. Fig. 2 represents a similar section in the focusing position. Fig. 3 is a lateral elevational view seen from the opposite side to Figs. 1 and 2. Fig. 4 is a vertical section cut parallel to and seen from the front of the camera. Fig. 5 is a section similar to that shown in Figs. 1 and 2 but with the camera collapsed. Fig. 6 is a detailed top view of the holding and releasing slide.

Referring now to these figures in greater detail:—

A represents the front of the camera, B the back, A' the bellows and E the hood thereof.

D is the focusing screen held in the frame $D^1$ which is pivoted at each of its front edges at points $D^2$ to the front A. To each side of the frame $D^1$ are pivoted at points $D^3$ the guiding surfaces or curved levers $D^5$ which in turn are pivoted links to $D^6$ which are pivoted to the front A.

To each side of the back edge of the frame D at the point $F^1$ is pivoted a rod F which supports the hood E said rod F being capable of sliding in the guide or socket N and having a tooth or notch $F^2$ which engages with the upper edge of the said socket when the camera is expanded. The rod F is pressed forward so as to bring the tooth $F^2$ into engagement with the top of the socket N and to keep it there, by a slide P (Fig. 6) which is actuated by a spring (not shown) which presses the said slide P to the right in Fig. 6.

$P^1$ is a handle pivoted to the slide P; and $P^2$ are two angular channels cut in the said slide through which pass studs $P^3$.

$P^4$ are projections with inclined edges adapted to abut against the rods F.

When the handle $P^1$ is pressed inward, the slide P moves inward and backward and the projections $P^4$ are then withdrawn so as to allow the teeth $F^2$ on the rods F to clear the top edge of the sockets N.

C is the mirror which swings at its axis $C^1$ pivoted at each side to arms H which are themselves pivoted below at points $H^1$ to the back B and joined above by the shaft $H^2$. The spring $C^2$ tends to bring the mirror into a horizontal position. The spring $C^2$ is wound around the axle $C^1$ and has one end thereof secured to said axle and its opposite end in engagement with the shaft $H^2$ (see Fig. 4). At the sides of the lower or front edge of the mirror are two pins $C^5$ which are adapted to engage beneath the levers $D^5$. On one of the pivoted arms H is a slide K which has two channels $K^1$ and $K^2$ through which pass the studs $H^4$ and $H^3$ (respectively) borne by the said arm H. The upper end of the slide K is pivotally attached to the mirror C by means of a link $C^4$.

$K^3$ is a stud attached to the slide K and adapted to be engaged by the lower edge of a slide L working on the side of the back B, a portion of the lever H being cut away to allow movement of the said stud $K^3$. The slide L has channels $L^1$ through which pass studs $L^2$ attached to the side of the back B; and a pin $L^3$ (Figs. 3 and 4) projecting through a vertical slot in the case of the camera permits the slide L to be moved when desired. This slide L or the projecting pin $L^3$ fixed thereon actuates, either directly or indirectly, the shutter releasing means such as a pawl or detent (not shown) of any well-known type; and any suitable focal plane shutter may be employed and any suitable means for adjusting the width of the aperture of said shutter (such for example as described in my British Patent No. 2,485 of 1907) may be employed, and any suitable means for retaining and releasing the focal plane shutter for producing either "time"

or "bulb" exposure (such for example as described in my British Patent No. 25,849 of 1908) may be employed.

In the arrangement illustrated the focal plane shutter employed (not shown) may be wound or "set" ready for giving an exposure by means of a winding wheel (not shown) such as illustrated in my British Patent No. 25,849 of 1908; and this said winding wheel (not shown) may be provided with a crank pin or stud (not shown) which will act on the slide L and depress the latter when the said winding wheel is rotated to set the shutter, and thereby the mirror will be swung down simultaneously with the setting of the shutter; while on releasing the spring actuated mirror C by means of the release pin $K^4$ (hereinafter described) the slide K will be raised by the upward swinging movement of the mirror C and by means of the pin $K^3$ will thereby raise the slide L, and the latter at or toward the end of its upward travel will actuate the shutter release (as aforesaid) and thereby release the shutter.

$K^4$ (Fig. 4) is a pin attached through the medium of a fixed lever to the pivoted arm H and projecting through a horizontal slot in the case and this pin $K^4$ serves as the shutter releasing means.

M is a spring tending to press the arm H forward. At the top of the hood there is pivoted a spring flap G which is attached by a cord $G^1$ to a point $C^3$ on the back of the mirror C, so that when the mirror is in its inclined position as in Fig. 2 the flap G is swung back against the action of its spring $G^x$ from the observation opening of the hood, while when the mirror is in its horizontal position as in Fig. 1 the flap G is allowed to cover the opening of the hood.

O (Fig. 3) are pivoted arms connecting the front A and the back B.

The camera acts as follows:—Commencing from its folded position as shown in Fig. 5; the hood E and the rods F are drawn upward until the notches $F^2$ are forced into engagement with the tops of the sockets N by the spring slide P. This has the effect of raising the frame $D^1$ and thereby pushing out the front A. The spring M swings forward the arms H and the mirror C being released from its folded position swings upward until the pins $C^5$ engage beneath the levers $D^5$. The cord $G^1$ withdraws the flap G from the opening of the hood and the camera assumes the position shown in Figs. 2 and 3. To make an exposure the pin $K^4$ (Fig. 3) is moved to the left and this (before the shutter is released) swings the levers H over to the left causing the pins $C^5$ to clear the edges of the levers $D^5$ and allows the mirror C to swing into its horizontal position as shown in Fig. 1 and thereby releases the shutter as aforesaid. At the same time the flap G is released and covers the opening of the hood. To re-set the camera the pin $L^3$ (Fig. 3) attached to the slide L is pressed downward and this causes the slide K to move and pull the mirror C into such a position that the pins $C^5$ clear the bottom edges of the levers $D^5$ when on releasing the pin $L^3$ the arms H will move outwardly and the pins $C^5$ will engage the bottom edges of the levers $D^5$. At the same time the flap G is withdrawn from the opening of the hood. To fold up the camera the handle $P^1$ is pressed inward and enables the teeth $F^2$ to clear the sockets N and then the rods F can be pressed downward and the parts drawn together.

I do not confine myself to the details of construction as illustrated but the scope of this invention is to be gathered from the claims hereunto annexed.

What I claim is:—

1. A folding camera comprising relatively movable sections; a focusing screen frame pivotally mounted on one of said sections and adapted to engage with the other section; a hood; rods mounted to slide vertically supporting said hood; means for supporting said rods; and pivotal connections between said rods and said screen frame, said screen frame adapted to engage with its respective movable section and open the camera when the hood is raised, substantially as described.

2. A folding reflex camera comprising a focusing screen frame pivotally mounted; a hood; slidable rods for supporting said hood; guide-ways in which said rods are movable; and a slidable locking plate for engaging with and holding said rods in raised position, substantially as described.

3. A folding reflex camera comprising a focusing screen frame pivotally mounted; links pivotally mounted at one end to said screen frame; pivotally mounted links connecting with the other ends of the first named links; and a swingingly mounted mirror, said first named links providing stops and guides for the swinging end of said mirror, substantially as described.

4. A folding reflex camera comprising a mirror; a pair of vertically disposed levers pivotally mounted at the lower ends thereof and located at the back of the camera; said mirror swingingly mounted to the upper ends of said levers; and means for moving said levers and swinging said mirror to and from position, substantially as described.

5. A folding reflex camera comprising a mirror; a pair of vertically disposed levers pivotally mounted at the lower ends thereof and located at the back of the camera; said mirror swingingly mounted to the upper ends of said levers; a member slidably mounted on one of said levers; a link connection between said slidable member and the mirror; and devices for actuating said slidable member to move the mirror, substantially as described.

6. A folding reflex camera comprising a mirror; a pair of vertically disposed and pivotally mounted levers; a spring engaging with and operable to move said levers; a spring associated with said mirror and operable to swing the same to substantially horizontal position; devices for engaging with and normally holding said mirror against swinging to horizontal position; and means associated with one of said levers for effecting the release of said mirror and allowing the same to swing to horizontal position, substantially as described.

7. A folding reflex camera comprising levers swingingly mounted; a mirror pivotally mounted on said levers; a spring associated with and normally tending to hold said mirror in operative position; stop members and guides for the mirror; a spring associated with said levers and acting to hold the mirror normally in engagement with said stop; devices for actuating the levers to release the mirror from said stop and allow said mirror to move to operative position; and devices for actuating said levers to move the mirror to be engaged by said stop, substantially as described.

8. A folding reflex camera comprising a hood having an observation opening; a flap adapted to close said opening; a swingingly mounted mirror; means for swinging said mirror to and from operative position; and connections between said mirror and said flap adapted to actuate the latter through the movements of the former, substantially as described.

Dated this 9th day of September 1910.

In witness whereof I have hereunto set my hand in presence of two witnesses.

ARTHUR LEWIS ADAMS.

Witnesses:
HENRY BIRKBECK,
H. D. JAMESON.